Dec. 19, 1933.  F. R. CORWIN ET AL  1,940,448
SEPARATING METALS
Filed Feb. 28, 1930  3 Sheets-Sheet 1

INVENTORS
Frank R. Corwin
Leon W. Booton
BY
ATTORNEY

Dec. 19, 1933.  F. R. CORWIN ET AL  1,940,448
SEPARATING METALS
Filed Feb. 28, 1930   3 Sheets-Sheet 2

INVENTORS
Frank R. Corwin
Leon W. Booton
BY
Ward Crosby Neal
ATTORNEY

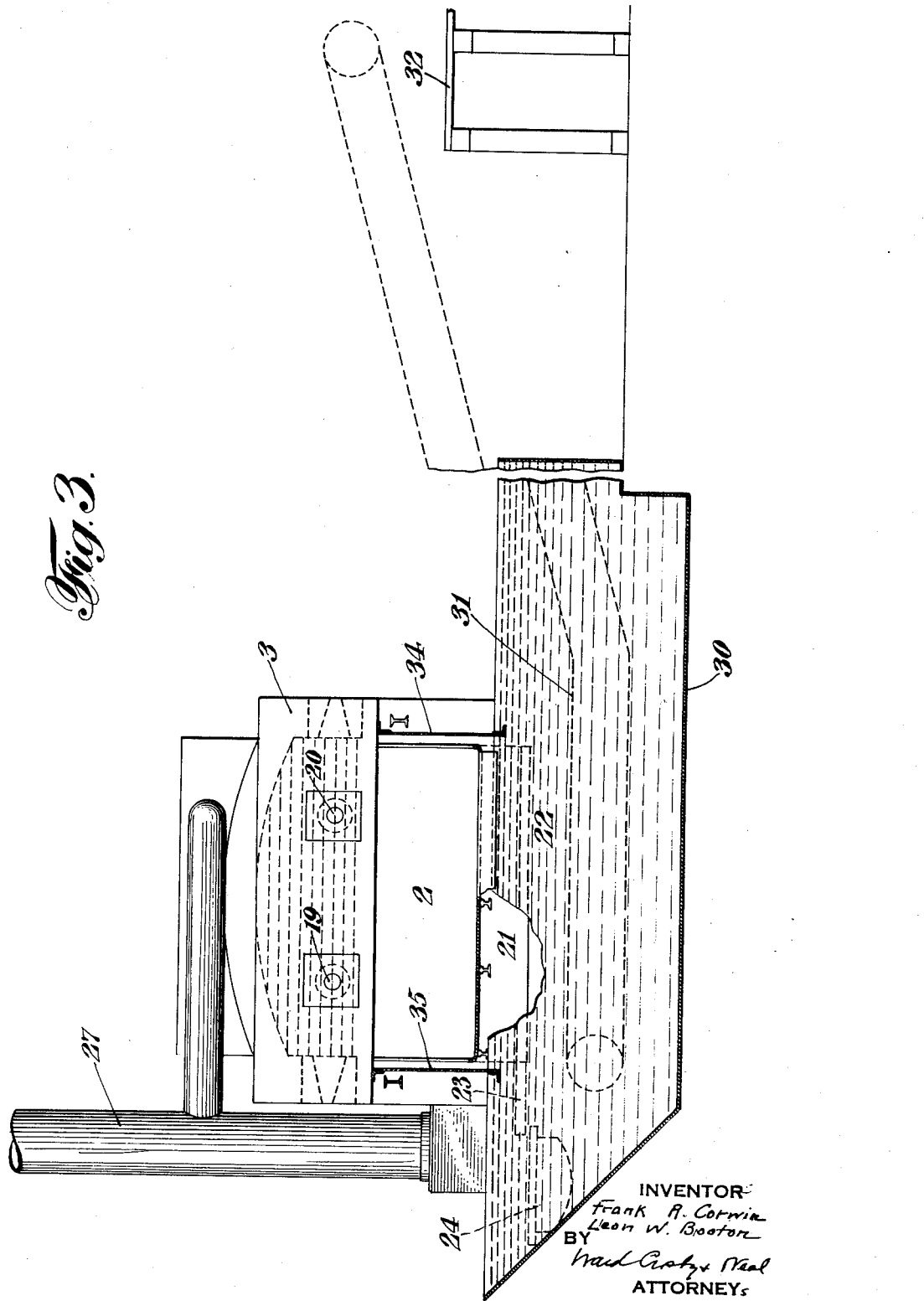

Patented Dec. 19, 1933

1,940,448

UNITED STATES PATENT OFFICE 1,940,448

SEPARATING METALS

Frank R. Corwin and Leon W. Booton, Forest Hills, N. Y., assignors to Nichols Copper Company, New York, N. Y., a corporation of New York Application February 28, 1930. Serial No. 432,047

9 Claims. (Cl. 263—43)

This invention relates to furnaces and more particularly to a furnace for treating scrap metal or the like containing low melting alloy such as solder to separate such alloys from the other metal. It also relates to a process for separating such alloys from the other metal.

An object of the invention is to provide a simple efficient apparatus of the kind described which may be constructed at a relatively low initial cost and maintained at a relatively low cost as compared with previous apparatus devised for this purpose. Another object is to provide a simple efficient process for separating such materials. Other objects will be in part obvious and in part pointed out hereinafter.

The invention accordingly comprises the novel apparatus and combinations thereof, as well as the novel processes and steps of processes which may be carried out in such apparatus, specific embodiments of which are described herein by way of example only and in accordance with the manner in which we now prefer to practice the invention.

In carrying out the process constituting a part of our invention, scrap metal containing low melting alloy is charged into the furnace chamber continuously in small lots at a time. These lots are gradually advanced into zones of gradually increasing temperatures, being agitated while being so advanced. The metal with its alloy is finally brought to a temperature where the alloy melts and aided to some extent by the agitation provided by the device this alloy descends by gravity through the mass and substantially immediately thereafter passes from the chamber into a collecting device where it is maintained in molten condition. The heat of the molten alloy is retained by the gases employed for heating the metal and alloy. These gases pass through the metal and along with the alloy which is trickling down, pass over the surface of the receptacle in which the alloy is collecting thus heating the mass, and then passing to the outside of the apparatus. The scrap metal, from which the molten alloy has been taken, is separately discharged from the chamber, passing to a quenching bath where the metal is cooled and then passes away from the furnace.

The process above described can be conveniently carried out in our preferred form of apparatus shown in the drawings.

Referring now to the drawings, Fig. 1 represents a plan view of the apparatus partially broken away through the perforated hearth to show the collecting trough therebeneath;

Fig. 3 is a discharge end elevation showing the quenching box in section and with a fragmentary showing of the conveyor belt.

Figure 1:
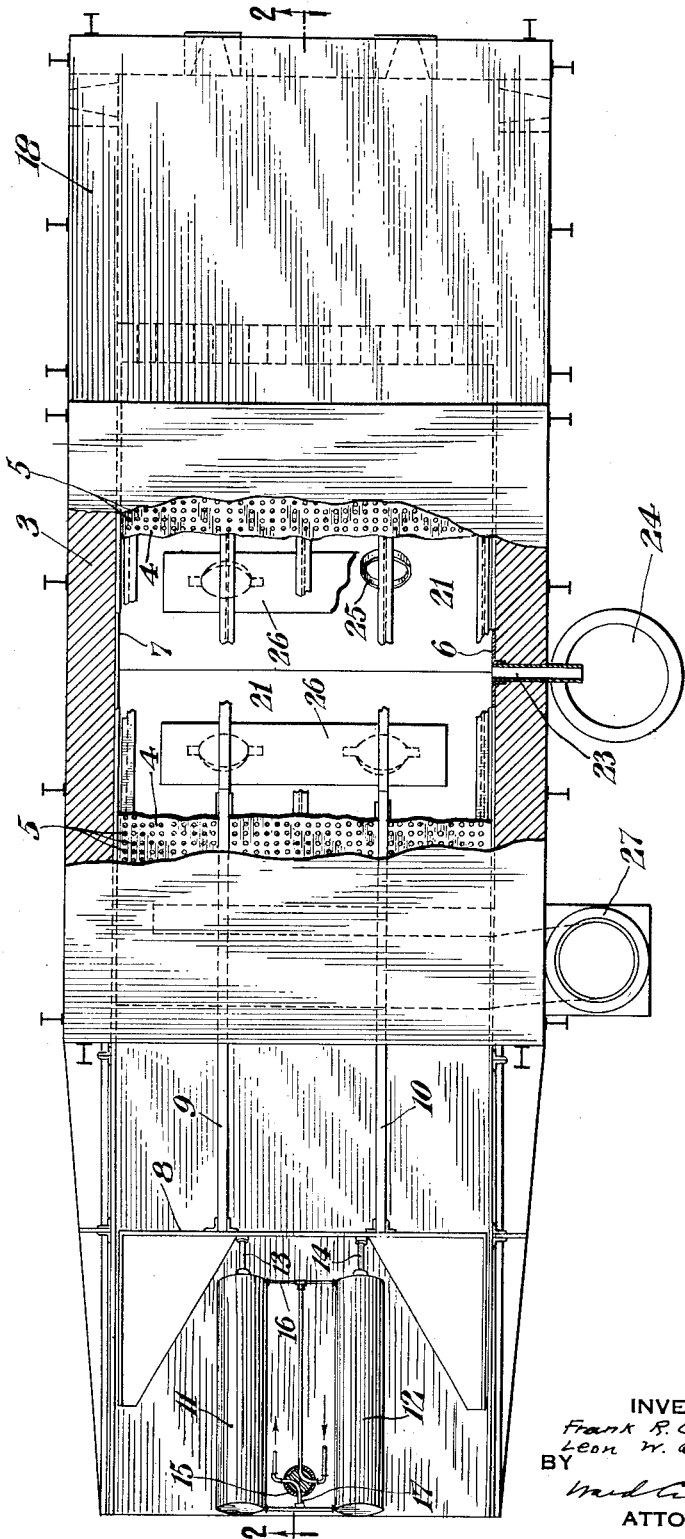
Figure 2:
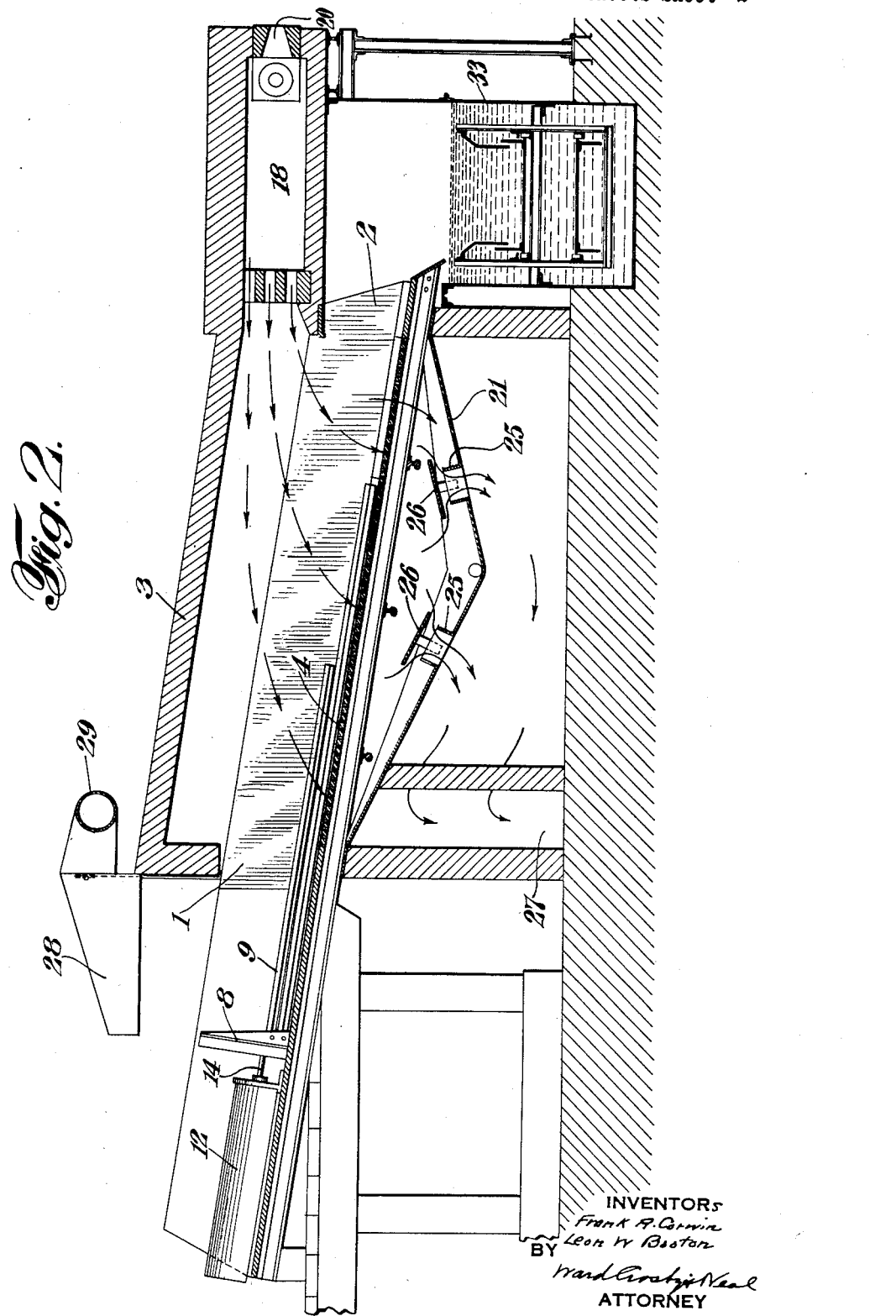
Fig. 2 is a side sectional elevation taken on the line 2—2 of Fig. 1.

Referring now to these drawings, there is shown a furnace having an inclined chamber and provided with an entrance 1 and an exit 2. The outer walls 3 of this furnace are preferably made of refractory material. The hearth 4 of the furnace is a heavy plate of steel provided with perforations 5. The hearth is shown as stationary and is inclined at an angel to the horizontal so that pieces of scrap metal placed thereon for example, copper automobile radiators containing solder or other similar scrap metals containing low melting alloys shall be held at or near the angle of repose therefor. Being placed in this position the scrap metal may be easily pushed along the hearth as will be hereinafter related. Low side walls of steel 6 and 7 line the sides of the furnace, these side walls being about half the height of the furnace and equal about to that of the entrance and exit, the top of the furnace acting as a reverberatory surface for the scrap metal on the hearth.

An air-operated ram 8 at the entrance into the furnace serves as a means for introducing and moving material charged at the entrance to the hearth. After the material has been charged at the entrance and the ram moved forward, it moves the material into the furnace on the hearth. Upon then being withdraw again and a fresh charge placed at the entrance, the ram moves forward moving this fresh charge which contacts with the initial charge in the furnace to move it still further along and upon successive charges being introduced in this manner the material moves continuously by stages along the whole length of the hearth. The ram has a head 8 which extends entirely across the entrance to the furnace to which are attached pusher rods 9 and 10 which advance with the ram and serve as pokers to agitate the metal on the hearth. A compressed air device is preferably employed for moving the ram. It comprises two air cylinders 11 and 12 having pistons therein with the rods 13 and 14 respectively connecting said pistons to the head 8. A source of compressed air not shown is supplied to a valve 15 which is connected to a pipe 16 leading to the end of the cylinders 11 and 12 near the head 8. A pipe 17 leads to the opposite ends of the cylinders 11 and 12. The valve contains passages communicating alternately with the pipe 16 and 17 so that air is admitted to one end or the other end of the cylinders as desired whereupon the pistons and their connecting rods are moved simultaneously in one direction or the other to move the ram back and forth as desired.

At the opposite end of the furnace and above and beyond the exit therefrom is a housing 18 for oil burners 19 and 20. These oil burners are arranged to throw heating gases towards the entrance end of the hearth as shown by the arrows in the figures and into contact with metals containing low melting alloys (such as solder) being moved along said hearth by said ram. These gases melt and separate the alloys from the other scrap metal and the separated molten alloy tends to trickle downward by gravity through the pieces of scrap metal.

In order that the molten alloy may be separated from the other metal and recovered, the floor of the hearth serves as a draining means and for this purpose the hearth is preferably perforated as shown at 5 and through these perforations the molten alloy passes. It will be understood of course that we do not restrict ourselves to a perforated hearth in order to permit the drainage of this molten alloy as other means such as spaced grate bars may be employed for this purpose. We prefer, however, to perforate the hearth and to carry the perforations from about the entrance to the hearth to near its exit. We have found in practice in employing this apparatus that the use of an easily controlled ram as we have described above, is highly effectual in freeing the molten alloy from the other metal since the ram jars the entire mass on the hearth as it moves new charges of scrap metal along the hearth and this jarring tends to upset and open any pockets which may contain the molten alloy, thus allowing the alloy to flow downwardly through the mass and through the perforations as mentioned.

Beneath the hearth is a substantially V-shaped trough 21 whose sides meet at a relatively wide angle and the line of the meeting of the sides, that is the tip of the V, as shown at 22 inclines downwardly to the left as shown in Fig. 3. Molten material passing through the perforation 5 finds its way into this trough and passes from there to the left of the furnace through a pipe 23 into a metal pot 24 where it is collected. This trough has a series of apertures therein, each of which passes through the bottom wall thereof, two being placed in each of the bottom walls and each of these apertures is provided with an upwardly projecting collar 25. Baffles 26 are placed above said collar to prevent molten metal falling through the perforations 5 and passing through the apertures. The heating gases passing from the oil burners 19 and 20 pass downwardly on to the mass of scrap metal on the hearth and then pass through the metal and through the perforations in the hearth out through the apertures mentioned on their way to stack 27.

Some of the gases containing fume, however, make their way to the entrance end and in order to overcome the objection of their being emitted there, a smoke-hood 28 is provided over the entrance end which communicates with the suction side of a blower which blower passes the fume by pressure through pipe 29 on its way to the stack 27.

At the exit end of the hearth is a quench-box 30 containing water to quench the heated scrap metal from which metal alloy has been taken. Metal pushed into this quench-box is immediately cooled and passes directly on to a continuously moving conveyor 31 having one end submerged in the quench-box. The conveyor then moves the metal out of the quench-box and upwardly on to a receiving platform or other location as desired. The quench-box has an end wall 33 which is continued upwardly until it reaches the end wall of the housing for the oil burners. Side walls 34 and 36 pass from a point adjacent the end of the hearth on either side thereof outwardly and join this end wall 33. The lower extremities of these side walls as shown in Fig. 3, dip under the water in the quench-box 30 so that the exit end of the furnace has a water seal. This water seal is provided so that hot gases and fume in the furnace chamber will be prevented from passing out of the exit end of the furnace, being entirely directed to the other exits for these gases and fumes from which they are conducted to the stack, to prevent oxidation of the metals by the influx of air (oxygen).

The apparatus described is simple and efficient in operation. It operates intermittently continuously. It has a low initial cost. Its maintenance is relatively low also. It has comparatively few parts and these parts are not apt to get out of order. It is, therefore, not necessary as has been the case with other furnaces for a similar purpose, to frequently shut down this furnace for repairs, thus interrupting operation and increasing the cost of maintenance.

While we have described our improvements in great detail and with respect to certain preferred embodiments thereof, we do not desire to be limited to such details or embodiments since many changes and modifications may be made and the invention embodied in widely different forms without departing from the spirit and scope thereof in its broader aspects. In this connection it will be understood that instead of heating the scrap metal on the hearth by means of the products of combustion of oil burners, other heating means may be used. For example we may employ an electric source of heat as secured by means of high frequency induction. We may also employ as an alternative a resistance electric furnace. In connection with either or any of these means of heating, we may employ, if desired, products of combustion from oil burners or other sources of heat. The form of the hearth may also be varied as stated above. Hence we desire to cover all equivalents and all modifications and forms coming within the language or scope of any one or more of the appended claims.

What we claim as new and desire to secure by Letters Patent is:

1. In apparatus of the kind described, in combination, a stationary chamber having an entrance for receiving material containing low melting metal, an exit and an inclined hearth extending from said entrance to said exit, and a ram device moving over said hearth for transferring said material from one part of said chamber to another part thereof, heating means for separating said low melting metal from said material during its transfer, said hearth having a draining device to retain said material while allowing molten metal to drain therethrough away from said material.

2. In apparatus of the kind described, in combination, a stationary chamber having an entrance for receiving material containing low melting metal, an exit and an inclined hearth extending from said entrance to said exit, a ram device provided with arms projecting into said chamber for transferring said material from the entrance of said chamber towards the exit thereof, a source of supply of heating gases for melting and separating said low melting metal from said material during its transfer, said inclined hearth being provided with a draining device to permit the molten low melting metal to separate from said material.

3. In apparatus of the kind described, in combination, a chamber having an entrance for receiving scrap metal containing a low melting alloy such as solder, means moving through said chamber for transferring said metal from one part thereof to another, a source of heating gases for melting said alloy to loosen it from said scrap metal, said alloy being then adapted to trickle through said scrap metal, means to conduct said heating gases through said metal along with said molten alloy to a device below thereby to retain said alloy in molten condition to promite its flow.

4. In apparatus of the kind described, in combination, a chamber having an entrance for receiving scrap metal containing a low melting alloy such as solder, and an exit, and a ram device for pushing said metal along an inclined hearth in said chamber, a source of heating gases for melting said alloy to melt and loosen it from said scrap metal, said hearth having draining openings therein to allow said molten alloy to drain therethrough, a trough beneath said hearth for receiving said molten alloy, said trough being provided with baffled apertures whereby said heating gases passing through said metal with said molten alloy serve to retain heat in said molten alloy as it collects in said trough and then pass through said baffled apertures on their way to the exterior of the furnace.

5. In apparatus of the kind described, in combination, a furnace having a stationery hearth inclined from the entrance to the exit at or near the angle of repose of scrap metal containing low melting alloys placed thereon, an air-operated ram to introduce and move material along said hearth, an oil burner in the upper part of said furnace located above the exit from said hearth, said burner being positioned to throw heating gases towards the entrance end of the hearth and into contact with metals being moved therealong by said ram, said hearth being perforated from about its entrance to about its exit, a trough having apertures therein provided with walls rising above the wall of the trough and baffles above said apertures to prevent molten metal passing therethrough but spaced from said apertures to allow the heating gases flowing from said burner through the perforations in the hearth to pass over the surface of molten alloy collecting in the trough to keep it heated, a quench-box at the exit end of said furnace provided with water sealing the exit end to prevent gases passing therefrom and prevents oxidation of metals by influx of air and a continuous conveyor having one end submerged in said quench-box to receive the metal pushed from said hearth and convey it away.

6. In an apparatus of the kind described, in combination a chamber for receiving material containing low-melting metal, a device for pushing the material in a substantially straight path through the chamber and heating means for melting said low melting metal and means for separating said low-melting metal from said material during its transfer.

7. In an apparatus of the kind described, in combination a chamber for receiving material containing low-melting metal, a device for intermittently pushing and jarring the material in a substantially straight path through the chamber and heating means for melting said low melting metal and means for separating said low-melting metal from said material during its transfer.

8. In an apparatus of the kind described, in combination, a chamber having an inclined stationary hearth provided with a draining device, an entrance for scrap material containing a low melting alloy, a heating device for melting said low melting alloy, and a relatively short stroke pusher for moving material across said hearth to an exit, said pusher pressing against the portion nearest it and thereby forcing any portion in advance on the hearth forward for a distance equal to the thrust of the pusher.

9. In an apparatus of the kind described, in combination, a stationary chamber having an entrance and an exit, for scrap metal containing low melting alloy such as solder, an inclined hearth to support said metal at or near its angle of repose, means for moving said metal from the entrance towards said exit, said hearth being provided with perforations and heating means for heating said metal to melt said alloy, said perforations permitting the molten alloy to flow away from said metal through said hearth, and a substantially V-shaped trough having the line of intersection of its walls forming the bottom of the V inclined transversely of said hearth to cause metal to flow towards one side and out of said furnace.

FRANK R. CORWIN.
LEON W. BOOTON.